(12) United States Patent
Won et al.

(10) Patent No.: US 10,154,444 B2
(45) Date of Patent: Dec. 11, 2018

(54) METHOD AND APPARATUS FOR IMPROVING HANDOVER SUCCESS RATE

(71) Applicant: Samsung Electronics Co., Ltd., Gyeonggi-do (KR)

(72) Inventors: Sung Hwan Won, Seoul (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/327,367

(22) PCT Filed: Jul. 17, 2015

(86) PCT No.: PCT/KR2015/007441
§ 371 (c)(1),
(2) Date: Jan. 18, 2017

(87) PCT Pub. No.: WO2016/010394
PCT Pub. Date: Jan. 21, 2016

(65) Prior Publication Data
US 2017/0171788 A1  Jun. 15, 2017

(30) Foreign Application Priority Data

Jul. 18, 2014 (KR) .......... 10-2014-0091248

(51) Int. Cl.
*H04W 36/08* (2009.01)
*H04W 76/18* (2018.01)
(Continued)

(52) U.S. Cl.
CPC ........... *H04W 36/08* (2013.01); *H04W 24/02* (2013.01); *H04W 24/10* (2013.01); *H04W 36/38* (2013.01);
(Continued)

(58) Field of Classification Search
CPC .............................. H04W 36/08; H04W 76/18
(Continued)

(56) References Cited

U.S. PATENT DOCUMENTS

2013/0017834 A1* 1/2013 Han ................. H04W 36/0083
455/437
2013/0260745 A1 10/2013 Johansson et al.
(Continued)

FOREIGN PATENT DOCUMENTS

EP   2541986 A1   1/2013
EP   2765805 A1   8/2014
(Continued)

OTHER PUBLICATIONS

Foreign Communication from Related Counterpart Application; European Patent Application No. 15821286.0; Extended European Search Report and European Search Opinion dated Feb. 20, 2018; 11 pages.

*Primary Examiner* — Chuck Huynh

(57) ABSTRACT

The present disclosure relates to a communication technique for combining a 5G communication system for supporting a higher data transmission rate after a 4G system with IoT technology, and a system thereof. The present disclosure can be applied to an intelligent service (for example, smart home, smart building, smart city, smart car or connected car, health care, digital education, retail business, security and safety-related service, and so on) on the basis of 5G communication technology and IoT related technology. The present disclosure can provide a method for supporting a handover and a base station performing the same. The method includes receiving a message including a Radio Link Failure (RLF) report for a terminal from at least another base station, and determining whether a cell in which an RRC connection reestablishment has been attempted by the terminal after the RLF is a cell that is suitable to serve the (Continued)

terminal at a time of RLF occurrence on the basis of at least one of RRC connection setup indicator information and the RLF report.

14 Claims, 11 Drawing Sheets

(51) Int. Cl.
  *H04W 24/10*   (2009.01)
  *H04W 36/38*   (2009.01)
  *H04W 24/02*   (2009.01)
  *H04W 36/00*   (2009.01)
(52) U.S. Cl.
  CPC ........ *H04W 76/18* (2018.02); *H04W 36/0083* (2013.01)
(58) Field of Classification Search
  USPC ................................ 455/438, 436, 444, 439
  See application file for complete search history.

(56) References Cited

U.S. PATENT DOCUMENTS

| | | | |
|---|---|---|---|
| 2014/0050197 A1* | 2/2014 | Legg | H04W 76/028 370/331 |
| 2014/0133465 A1 | 5/2014 | Johansson et al. | |
| 2014/0248882 A1* | 9/2014 | Wang | H04W 24/04 455/436 |
| 2014/0370914 A1 | 12/2014 | Jung et al. | |
| 2015/0249950 A1* | 9/2015 | Teyeb | H04W 36/0016 455/437 |

FOREIGN PATENT DOCUMENTS

| | | |
|---|---|---|
| EP | 2941082 A1 | 11/2015 |
| KR | 10-2012-0138794 A | 12/2012 |
| KR | 10-2013-0009839 A | 1/2013 |
| WO | 2012-019362 A1 | 2/2012 |
| WO | 2013071856 A1 | 5/2013 |
| WO | 2013111997 A1 | 8/2013 |
| WO | 2014101171 A1 | 7/2014 |

* cited by examiner

METHOD AND APPARATUS FOR IMPROVING HANDOVER SUCCESS RATE

CROSS-REFERENCE TO RELATED APPLICATION(S)

The present application claims priority under 35 U.S.C. § 365 to International Patent Application No. PCT/KR2015/007441 filed Jul. 17, 2015, entitled "METHOD AND APPARATUS FOR IMPROVING HANDOVER SUCCESS RATE," and to Korean Patent Application No. 10-2014-0091248 filed Jul. 18, 2014, each which are incorporated herein by reference into the present disclosure as if fully set forth herein.

TECHNICAL FIELD

The present disclosure relates generally to a wireless communication system, and more particularly, to a method and a system for transmitting/receiving data, which can reduce a transmission timing interval.

BACKGROUND ART

In order to meet the wireless data traffic demand that is on an increasing trend after commercialization of 4G communication system, efforts for developing improved 5G communication system or pre-5G communication system have been made. For this reason, the 5G communication system or pre-5G communication system has been called beyond 4G network communication system or post LTE system. In order to achieve high data rate, implementation of 5G communication system in a millimeter Wave (mmWave) band (e.g., like 60 GHz band) has been considered. In order to mitigate a radio wave path loss and to increase a radio wave transmission distance in the mmWave band, technologies of beam-forming, massive MIMO, Full Dimension MIMO (FD-MIMO), analog beam-forming, and large scale antenna for the 5G communication system have been discussed. Further, for system network improvement in the 5G communication system, technology developments have been made for an evolved small cell, improved small cell, cloud Radio Access Network (cloud RAN), ultra-dense network, Device to Device communication (D2D), wireless backhaul, moving network, cooperative communication, Coordinated Multi-Points (CoMP), and reception interference cancellation. In addition, Hybrid FSK and QAM Modulation (FQAM) and Sliding Window Superposition Coding (SWSC), which correspond to Advanced Coding Modulation (ACM) system, and Filter Bank Multi Carrier (FBMC), Non-Orthogonal Multiple Access (NOMA), and Sparse Code Multiple Access (SCMA), which correspond to advanced connection technology, have been developed in the 5G system.

On the other hand, the Internet, which is a human centered connectivity network where humans generate and consume information, is now evolving to the Internet of Things (IoT) where distributed entities, such as things, exchange and process information. The Internet of Everything (IoE), which is a combination of the IoT technology and big data processing technology through connection with a cloud server, has emerged. As technology elements, such as sensing technology, wired/wireless communication and network infrastructure, service interface technology, and security technology have been demanded for IoT implementation, a sensor network, a Machine-to-Machine (M2M) communication, Machine Type Communication (MTC), and so forth have been recently researched. Such an IoT environment may provide intelligent Internet Technology (IT) services that create new values to human life by collecting and analyzing data generated among connected things. The IoT may be applied to a variety of fields including smart home, smart building, smart city, smart car or connected cars, smart grid, health care, smart appliances and advanced medical services through convergence and combination between existing Information Technology (IT) and various industrial applications.

Accordingly, various attempts to apply the 5G communication system to an IoT network have been made. For example, technologies of sensor network, Machine to Machine (M2M), and Machine Type Communication (MTC) have been implemented by techniques for beam-forming, MIMO, and array antennas, which correspond to the 5G communication technology. Application of the cloud RAN as the big data processing technology as described above could be an example of convergence between the 5G technology and the IoT technology.

In general, a wireless communication system has been developed to provide a voice service as well as securing user's activity. Further, the wireless communication system has gradually extended its service up to a data service in addition to the voice service, and has currently been developed up to the extent that it can provide a high-speed data service.

FIG. 1 is a diagram illustrating the configuration of a wireless communication system. Referring to FIG. 1, a wireless communication system may include a terminal 100, a Radio Access Network (RAN) 130, and a Core Network (CN) 140.

The kind of the RAN 130 is divided depending on what Radio Access Technology (RAT) the RAN 130 uses. Accordingly, the terms "RAN" and "RAT" may be mixedly used. Representative examples of the RAM 130 may be a Global system for mobile communications Enhanced data rates for global system for mobile communications RAN (GERAN), a Universal Terrestrial RAN (UTRAN), and an Evolved-UTRAN (E-UTRAN). In particular, the E-UTRAN is also called a Long-Term Evolution (LTE).

The RAN 130 may include several constituent elements. In FIG. 1, for simplicity, only one constituent element is illustrated in the RAN 130, but several constituent elements may be included in the RAN 130. One constituent element 120 of the RAN 130 that interacts with the terminal 100 may communicate with the terminal 100 through a wireless interface 110. The remaining elements of the wireless communication system may be mainly connected by wire. The constituent element 120 of the RAN 130 that interacts with the terminal 100 through the wireless interface 110 may be called, for example, at least one of an evolved Node B (eNB), a Node B (NB) and/or a Radio Network Subsystem (RNS) including the same, a Base Transceiver Station (BTS) or a Base Station Subsystem (BSS) including the same, a radio access point, a home eNB, a home NB, a home eNB Gateway (GW), and an X2 GW. In the description, for convenience, the term "Radio Access Point (RAP)" may be called at least one of examples of the constituent elements 120 of the RAN 130 enumerated as above or the RAN 130 itself.

The RAP 120 may be composed of one or more cells. The cell manages a specific coverage, and the terminal 100 is served within the coverage of the cell. Here, the cell means a cell of a cellular system, and the RAP 120 means a device that manages and controls the cell. However, in the description, for convenience, the cell and the RAP 120 may have the same meaning. Even in explaining one subject (e.g., embodiment), the cell and the RAP 120 may be mixedly used for convenience.

The CN 140 may include a RAN control element. The RAN control element serves to perform overall control function, such as mobility management, authentication, and security. The RAN control element may be called at least one of a Mobility Management Entity (MME) and Serving General Packet Radio Service (GPRS) Support Node (SGSN), and a Mobile Switching Center (MSC).

If the terminal 100 secedes from the coverage of a serving cell due to movement of the terminal 100 or if it is expected that the terminal 100 secedes from the coverage of the serving cell in the near future, a new cell provides a service to the terminal 100 so that the terminal 100 can seamlessly receive the service. As described above, a process in which the serving cell is changed is called a handover. A cell that provided the service to the terminal 100 before the serving cell is changed is called a source cell, and a cell that provides the service to the terminal 100 after the serving cell is changed is called a target cell.

The terminal 100 measures a signal of a cell and reports the measured signal to the serving RAP 120. The cell from which the signal is measured includes one or more of a serving cell and a neighboring cell. The cell that has received the report may determine a start of a handover on the basis of one or more of reported measurement information and a pre-stored mobility parameter. If the mobility parameter is properly set, the handover can start at a proper time. The mobility parameter is a general term for several parameters. Examples of the several parameters may be a mobility parameter that is used to determine a start of a handover for a cell that uses a specific frequency band as a target, a mobility parameter that is used to determine a start of a handover for a cell of a specific RAN 130 as a target, and a mobility parameter that is used to determine a start of a handover for a specific cell as a target.

FIGS. 2A, 2B, and 2C are diagrams illustrating situations in which a mobility parameter is not properly set to cause a connection failure to occur. A connection failure may occur in the case where a handover does not occur at a time when the handover should be performed (Radio Link Failure (RLF)), or a connection failure may occur during the handover (HandOver Failure (HOF)). In the description, the connection failure may be called an RLF and/or HOF.

FIG. 2A is a diagram illustrating a Too Late Handover (TLH). In FIG. 2A, if a mobility parameter of a RAP 120a is set to have a tendency to start a handover too late, the RAP 120a may cause an RLF 210 through providing a service to the terminal 100 continuously unreasonably even in the case where the serving terminal 100 has already seceded from the coverage of the cell in the RAP 120a. After the connection failure 210, the terminal 100 makes a connection to a cell that is different from the above-described cell. Since the mobility parameter of the RAP 120a is not properly set to cause the too late handover to occur, it is necessary to control the mobility parameter of the RAP 120a.

In FIG. 2A, the cell that is connected to the terminal 100 after the connection failure 210 is depicted as a cell within a RAP 120b that is different from the RAP 120a, but it is not necessary that the cell becomes the cell within the other RAP 120b. However, if the cell connected after the connection failure 210 and the cell connected before the connection failure 210 are cells in the same RAP 120a, follow-up measures between the RAPs 120a and 120b may not be separately necessary. In the description, a case where the cells that are connected before and after the connection failure are cells in different RAPs 120 is mainly considered as a more general situation, but even a case where the connected cells are cells in the same RAP 120 would not be excluded.

FIG. 2B is a diagram illustrating a Too Early Handover (TEH). In FIG. 2B, a mobility parameter of a RAP 120a is set to have a tendency to start a handover too early. In this case, the RAP 120a unreasonably starts a handover to another cell even in the case where the serving terminal 100 is still within the coverage of the cell in the RAP 120a. Accordingly, an RLF 230 may occur even in the case where it is not long since the handover occurred, or a HOF 235 may occur during the handover. After experiencing the connection failure, the terminal 100 makes a connection to a cell in the RAP 120a again. Since the mobility parameter of the RAP 120a is not properly set to cause the too early handover to occur, it is necessary to control the mobility parameter of the RAP 120a.

FIG. 2C is a diagram illustrating a Handover to Wrong Cell (HWC). Referring to FIG. 2C, if a mobility parameter of a RAP 120a is set to have a tendency to start a handover to a wrong cell (cell in a RAP 120b), the RAP 120a does not start a handover to a cell (cell in a RAP 120c) that is suitable to actually provide a service to the serving terminal 100, but starts the handover to a preposterous cell. Accordingly, an RLF 260 may occur even in the case where it is not long since the handover occurred, or a HOF 265 may occur during the handover. After experiencing the connection failure, the terminal 100 makes a connection to a cell in the RAP 120c. Since the mobility parameter of the RAP 120a is not properly set to cause the handover to a wrong cell (cell in the RAP 120b) to occur, it is necessary to control the mobility parameter of the RAP 120a.

After the connection failure 210, 230, 235, 260, and/or 265, the terminal 100 may transmit a reestablishment request to the RAP 120 that includes a suitable cell (no mode change). If a suitable cell is not found for a predetermined time, the terminal 100 may be shifted to an idle mode, and then if the suitable cell is found, the terminal 100 may be shifted to a connected mode.

In the case where the suitable cell is not found for the predetermined time, the connection failure reason may be that the terminal 100 has moved to a shaded area or an internal problem (e.g., security related problem) of the terminal 100, rather than that the handover starts too late, too early, or to a wrong cell. That is, the connection failure may not be caused by problems in setting the mobility parameter of the RAP 120. Accordingly, in this case, it may not be necessary to separately take Mobility Robustness Optimization (MRO) measures.

In contrast, if the terminal 100 transmits the reestablishment request after the connection failure 210, 230, 235, 260, and/or 265, the terminal 100 may take MRO measures under the assumption that the reestablishment request target cell (cell in the RAP 120b in FIG. 2A, cell in the RAP 120a in FIG. 2B, or cell in the RAP 120c in FIG. 2C) is a cell that is suitable to serve the terminal 100 at the time of the connection failure 210, 230, 235, 260, and/or 265. The MRO measurements will be described in detail later.

The assumption that the reestablishment request target cell is a cell that is suitable to serve the terminal 100 at the time of the connection failure may be effective, for example, when the reestablishment is successfully performed. For example, if the reestablishment request is not suitably transferred to the RAP 120 and thus the reestablishment is not successfully performed, the assumption that the reestablishment request target cell is a cell that is suitable to serve the terminal 100 at the time of the connection failure may not be effective.

However, the current MRO measurements are being performed in consideration of the reestablishment attempt itself, without considering the reestablishment result. Accordingly, there has been a need for the MRO measurements in consideration of the reestablishment result.

DISCLOSURE OF INVENTION

Technical Problem

The present disclosure has been made in order to solve the above problems, and an aspect of the present disclosure provides a method and an apparatus for heightening a handover success rate.

Solution to Problem

In one aspect of the present disclosure, a method for supporting a handover of a base station includes receiving a message including a Radio Link Failure (RLF) report for a terminal from at least another base station; and determining whether a cell in which an RRC connection reestablishment has been attempted by the terminal after the RLF is a cell that is suitable to serve the terminal at a time of RLF occurrence on the basis of at least one of RRC connection setup indicator information and the RLF report.

In another aspect of the present disclosure, a base station includes a transceiver unit configured to transmit and receive a signal; and a control unit configured to receive a message including a Radio Link Failure (RLF) report for a terminal from at least another base station, and to determine whether a cell in which an RRC connection reestablishment has been attempted by the terminal after the RLF is a cell that is suitable to serve the terminal at a time of RLF occurrence on the basis of at least one of RRC connection setup indicator information and the RLF report.

In still another aspect of the present disclosure, a method for supporting a handover of a Radio Access Point (RAP) includes sensing a Radio Link Failure (RLF) for at least one terminal; receiving an RLF indication message for the terminal; determining whether an RRC connection reestablishment target cell of the terminal is a suitable serving cell of the terminal with respect to the RLF; and applying the RLF indication message to handover support information update on the basis of the determination result.

In yet still another aspect of the present disclosure, a device of a Radio Access Point (RAP) for supporting a handover includes a transceiver unit configured to perform communication with at least one network node; and a control unit configured to sense a Radio Link Failure (RLF) for at least one terminal, to receive an RLF indication message for the terminal, to determine whether an RRC connection reestablishment target cell of the terminal is a suitable serving cell of the terminal with respect to the RLF, and to apply the RLF indication message to handover support information update on the basis of the determination result.

Advantageous Effects of Invention

In accordance with embodiments of the present disclosure, a method and an apparatus for heightening a handover success rate in a mobile communication system can be provided.

Further, in accordance with embodiments of the present disclosure, in order to improve the handover success rate, the reestablishment result of the terminal can be used during the MRO measurements. Further, in accordance with embodiments of the present disclosure, a method for identifying the reestablishment result can be provided.

MODE FOR THE INVENTION

Figure 1:
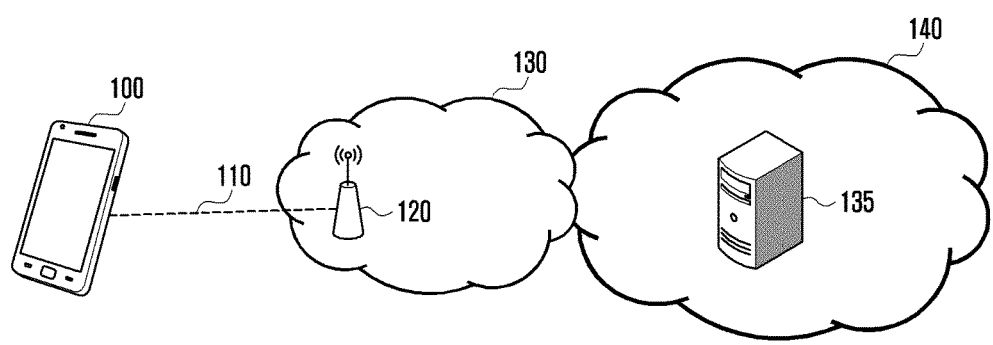
FIG. 1 is a block diagram illustrating a general wireless communication system.
Figure 2A:
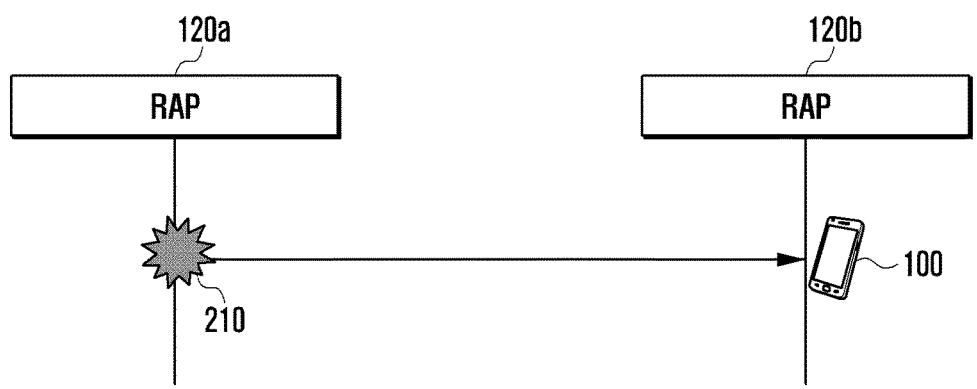
FIG. 2A is a diagram illustrating a too late handover.
Figure 2B:
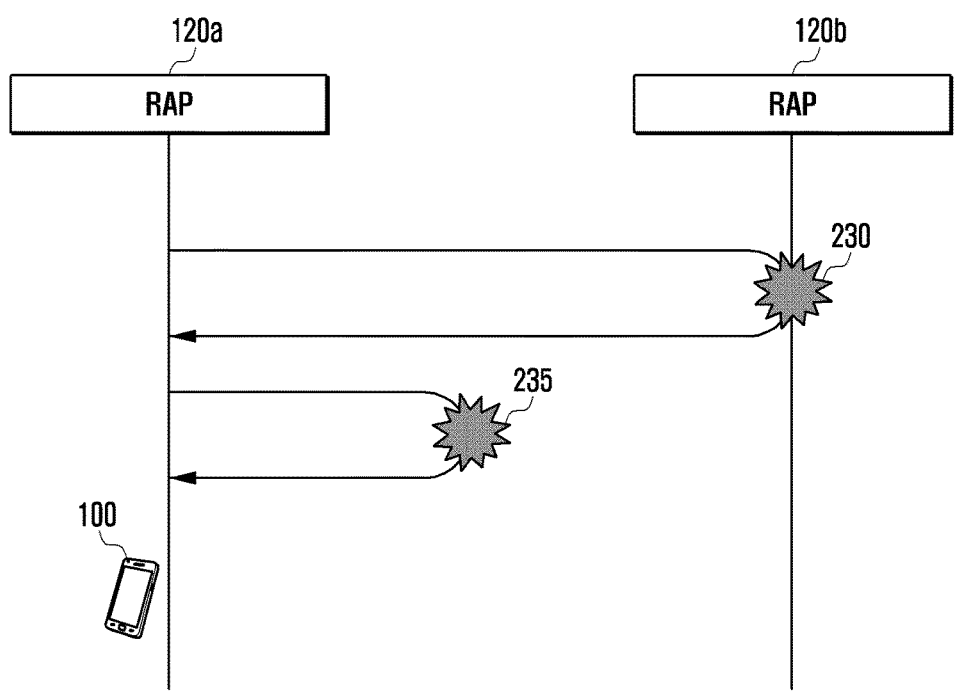
FIG. 2B is a diagram illustrating a too early handover.
Figure 2C:
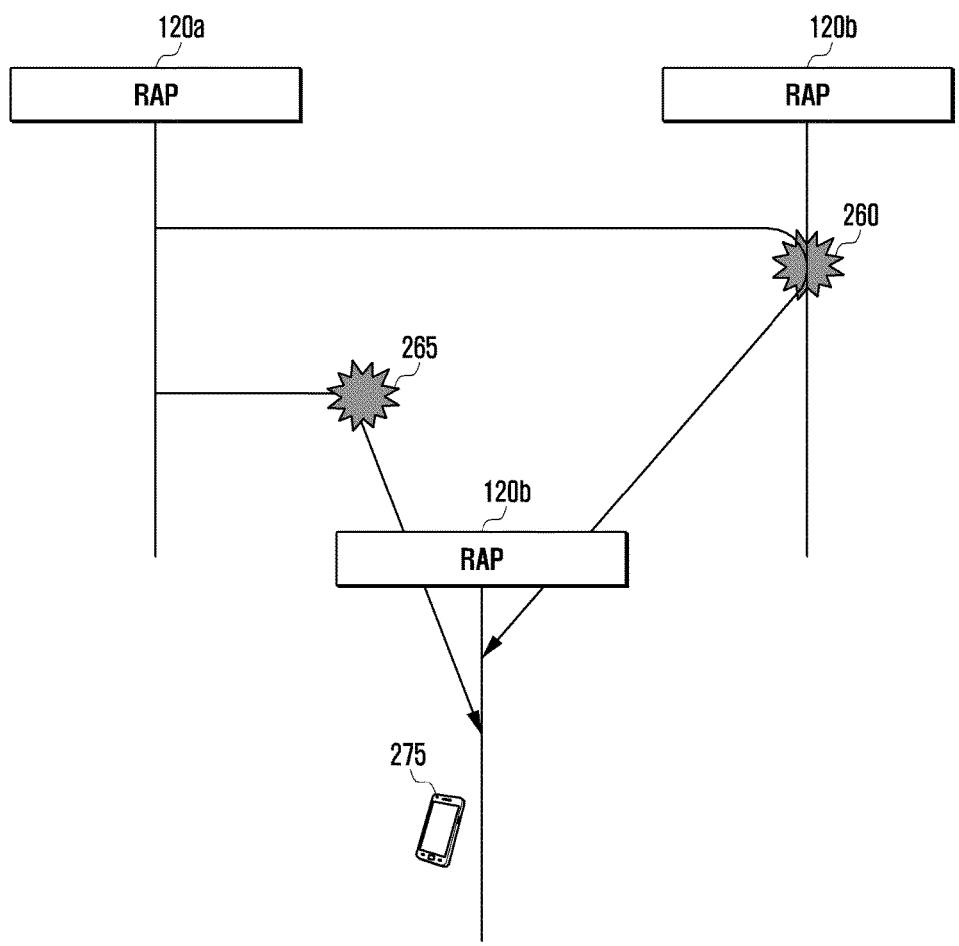
FIG. 2C is a diagram illustrating a handover to a wrong cell.

Hereinafter, preferred embodiments of the present disclosure will be described with reference to the accompanying drawings. In the accompanying drawings, the same reference numerals are used for the same constituent elements. Further, detailed description of well-known functions and configurations incorporated herein may be omitted to avoid obscuring the subject matter of the present disclosure.

Further, in describing embodiments of the present disclosure in detail, an LTE including a RAN 130 and a CN 140, of which the standards have been determined by the $3^{rd}$ Generation Partnership Project (3GPP) group, and an Evolved Packet Core (EPC) will be main application subjects. However, the main concept of the present disclosure can be applied to other communication systems having similar technical backgrounds with a slight modification within a range that does not greatly deviate from the scope of the present disclosure, according to the judgment of a person skilled in the art to which the present disclosure pertains.

In an embodiment of the present disclosure, a radio link failure indication message may be called an RLF indication message. Handover support information may include a mobility parameter. A handover support information update may include a mobility parameter control.

Figure 3:
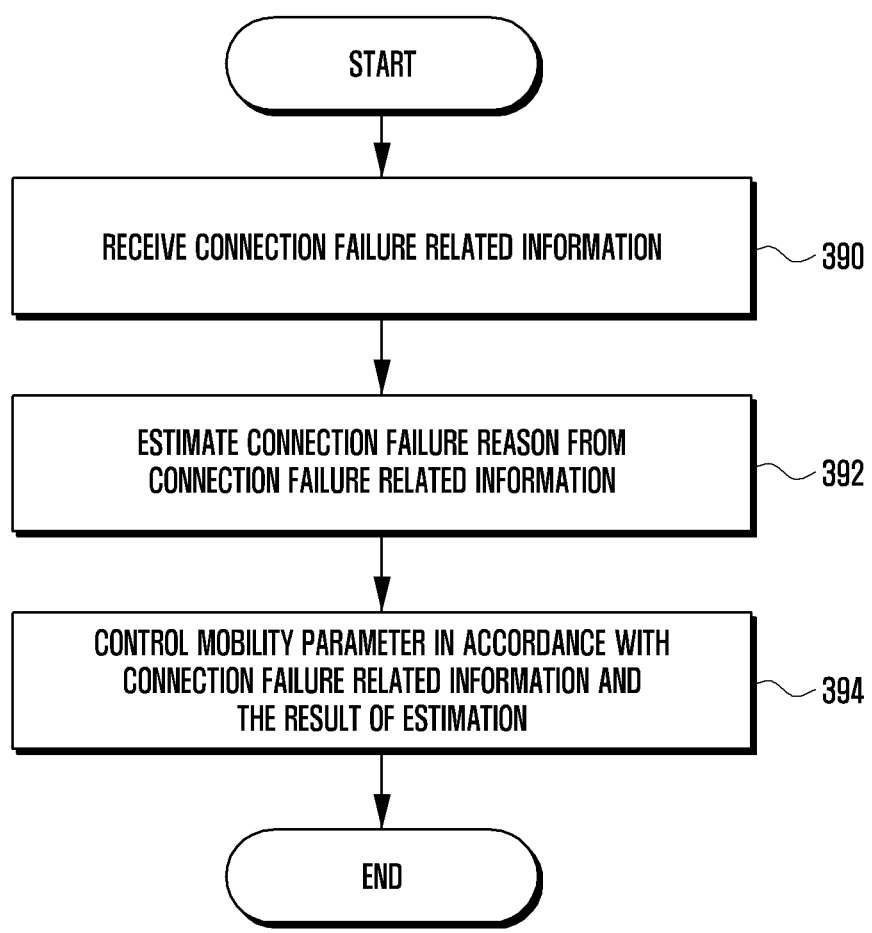
FIG. 3 is a flowchart illustrating an MRO measurement process according to an embodiment of the present disclosure.

FIG. 3 is a flowchart illustrating an MRO measurement process according to an embodiment of the present disclosure.

At operation 390, a RAP 120 receives connection failure related information. The connection failure related information may be information that is obtained from a terminal 100 that has experienced a connection failure. More specifically, the connection failure related information may refer to:

a part of information that is included in a reestablishment request message, and/or the whole or a part of information that is included in an RLF report, which are transmitted by the terminal 100.

At operation 392, the RAP 120 may estimate a connection failure reason from the connection failure related information. The RAP that receives the connection failure related information from the terminal 100 at operation 390 and the RAP that estimates the connection failure reason at operation 392 may be different entities. In this case, the RAP (RAP mentioned at operation 390) that has received the connection failure related information from the terminal 100 may transmit the connection failure related information that is received from the terminal 100, information obtained by processing the connection failure related information, and/or additionally required information to the RAP (RAP mentioned at operation 392) that estimates the connection failure reason.

The additionally required information may be information that is related to the reestablishment result. The reestablishment result related information may be explicitly presented or may be implicitly presented. When the RAP that has received the connection failure related information from the terminal 100 transmits the information to the RAP that estimates the connection failure reason, the information may be directly (e.g., through an X2 interface that is an interface between RAPs) transferred, or may be transmitted through one or more entities. The entities through which the information passes may include at least one of the one or more RAPs and the one or more RAN control elements.

At operation 394, the RAP 120 may use the connection failure related information and information on the estimation result as inputs for the mobility parameter control. Since the RAP that estimates the connection failure reason mentioned at operation 392 may differ from the RAP that actually requires the mobility parameter control, it may be necessary that the RAP that estimates the connection failure reason transfers the information to the RAP that uses the connection failure related information and the information on the estimation result as the inputs for the mobility parameter control.

Figure 4A:
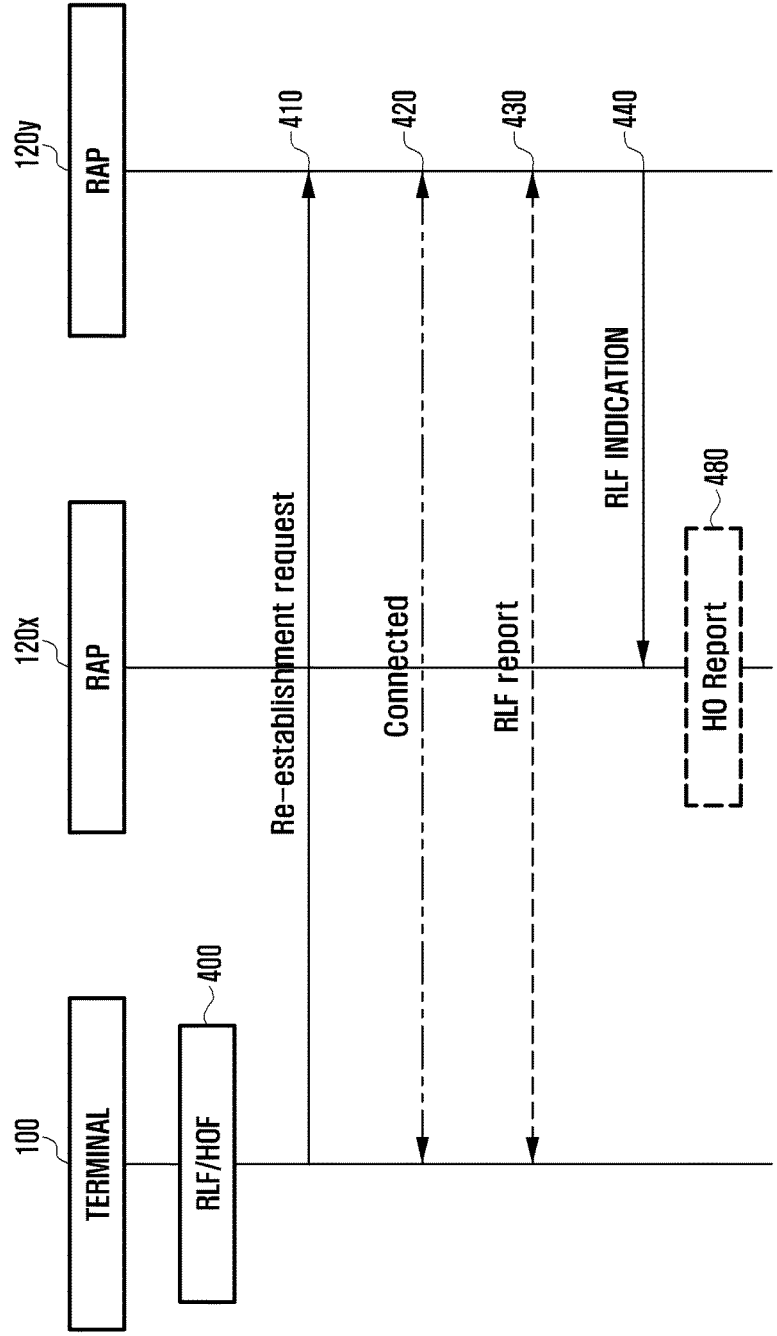
FIGS. 4A, 4B, and 4C are signal flowcharts of an MRO measurement process according to an embodiment of the present disclosure.
Figure 4B:
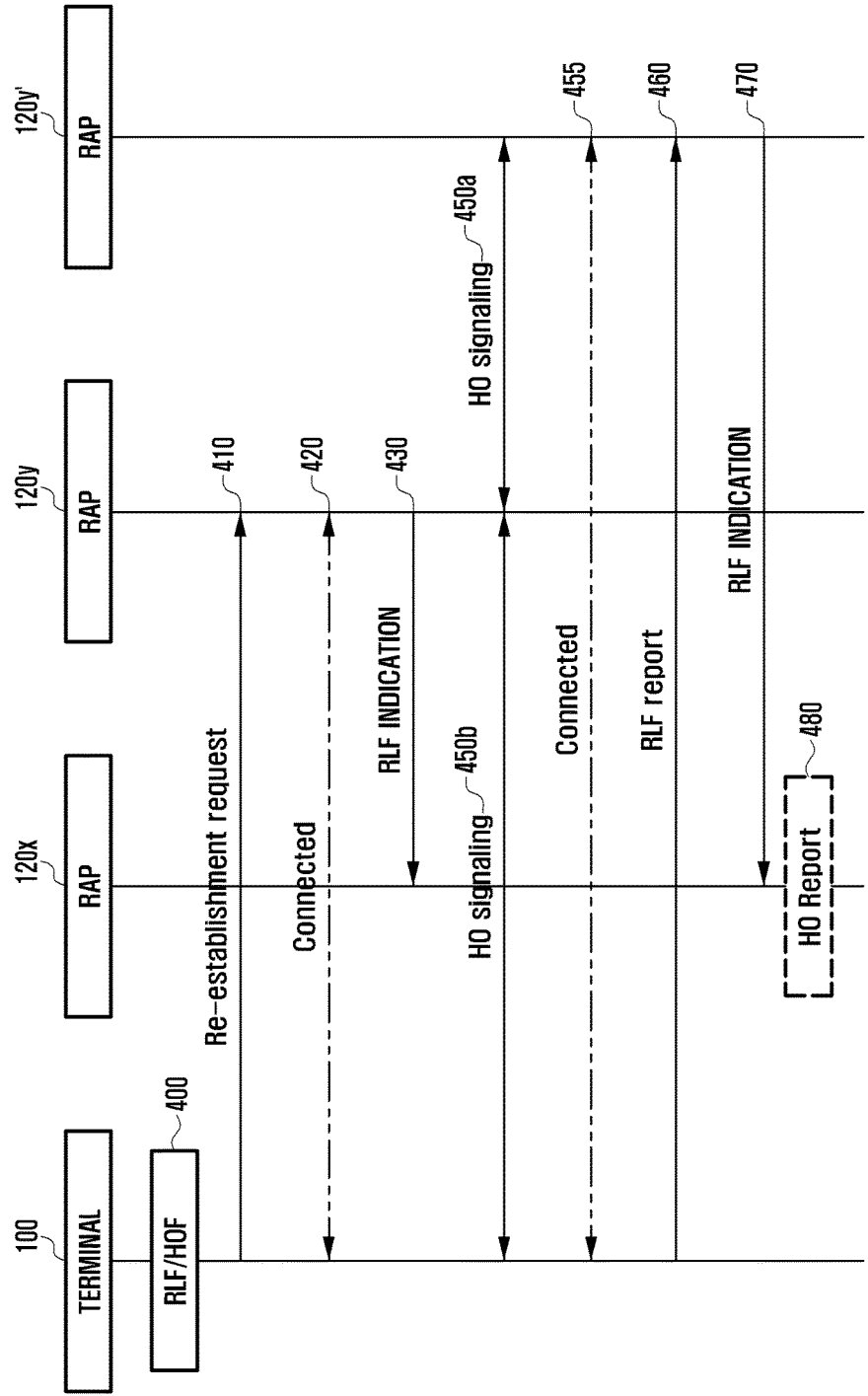
Figure 4C:
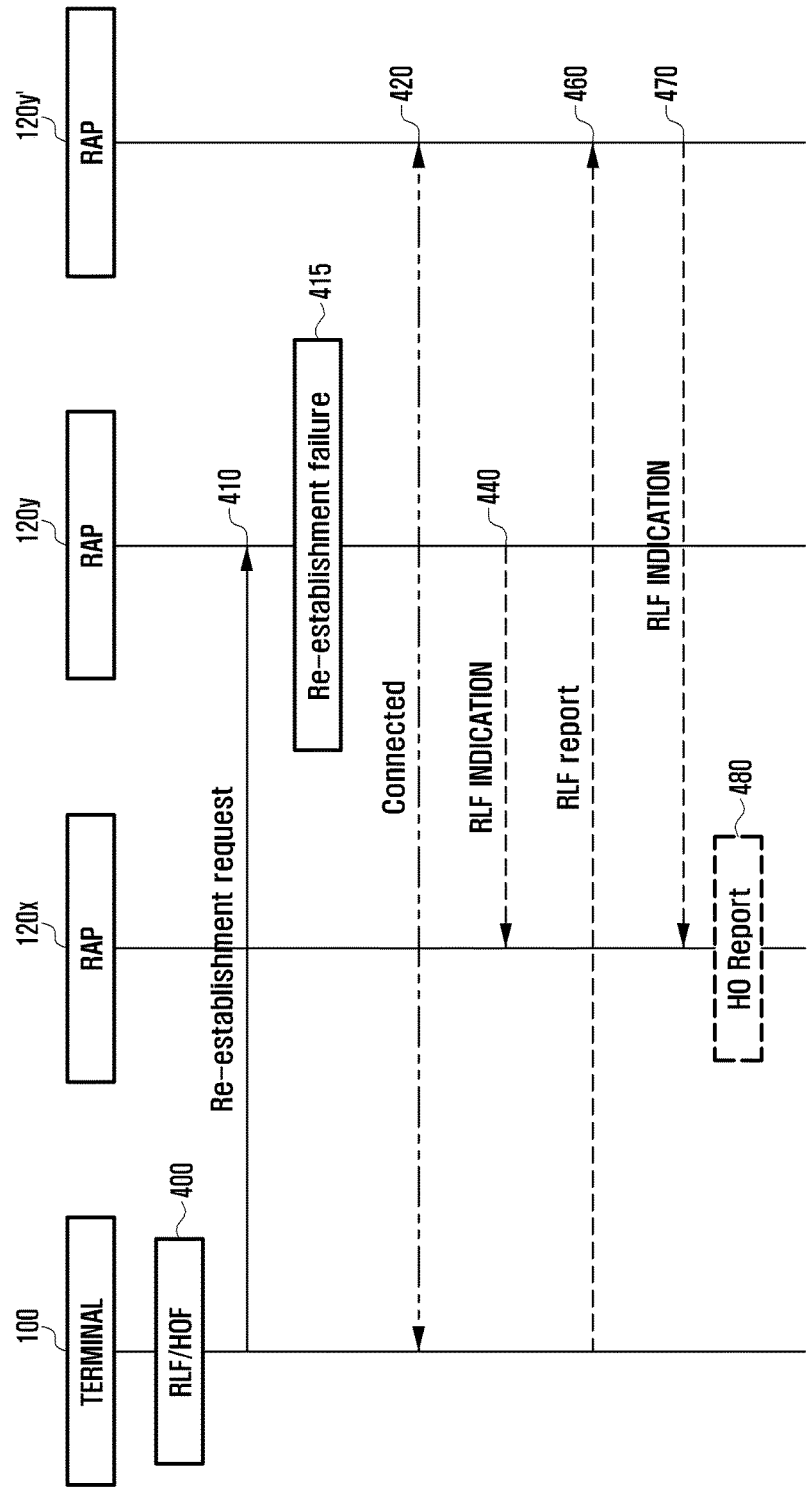

FIGS. 4A, 4B, and 4C are signal flowcharts of an MRO measurement process according to an embodiment of the present disclosure.

The signal flow for the MRO measurement process may have varieties in accordance with several references. A representative reference may be the reestablishment result and the character (whether the RAP becomes the target of reestablishment attempt) of the RAP that receives an RLF report. A reestablishment request message and an RLF report are basic inputs used for the MRO measurements. Generally speaking, the signal flow for the MRO measurement process may differ depending on whether the reestablishment request message has been properly transferred to the RAP and which RAP has received the RLF report.

The reestablishment result may be briefly divided into success and failure. The failure may be further sub-divided and classified into the following items:

Reestablishment failure A: The RAP that has become a reestablishment target rejects the reestablishment (transfers RRCConnectionReestablishmentReject message);

Reestablishment failure B: The reestablishment request message (RRCConnectionReestablishmentRequest message) has been well transferred, but the reestablishment has been incompletely finished. For example, an RRCConnectionReestablishment message has not been transferred to the terminal, or an RRCConnectionReestablishmentComplete message has not been transferred to the RAP; and Reestablishment failure C: The RAP is unable to receive the reestablishment request message.

The reestablishment request message may include information on the connection failure. More specifically, the reestablishment request message may include one or more pieces of information as follows:

Physical Cell Identity (PCI) of a cell to which the terminal was connected just before the connection failure;

Cell Radio Network Temporary Identifier (C-RNTI) used in a cell to which the terminal was connected just before the connection failure;

Connection failure short Media Access Control Identity (short MAC-I) that is made by an identifier of a cell that is the reestablishment target and security related information used in a cell to which the terminal was connected just before the connection failure; and Reestablishment cause, for example, reconfiguration failure, HOF, and other failures.

In the case of the RLF, the cell to which the terminal was connected just before the connection failure means a serving primary cell just before the RLF, and in the case of the HOF, the cell means a source primary cell at the time of the HOF occurrence. Since the reestablishment request message includes information for analyzing the connection failure, the MRO measurements can be performed even if the RLF report is not received. That is, in the case of the reestablishment success and in the case of the reestablishment failure A and B, the reestablishment request message has been transferred to the RAP regardless of whether the reestablishment has succeeded, and thus the MRO measurements can be performed even without the RLF report.

On the other hand, the terminal that has experienced the connection failure can transmit an indicator indicating that the RLF report is available in the terminal to the RAP unless it has transmitted the RLF report for the corresponding connection failure. If this indicator is received, the RAP may request the RLF report to receive the RLF report from the terminal, or may not request the RLF report not to receive the RLF report from the terminal. The RLF report may include one or more pieces of information as follows:

In the case of RLF, an E-UTRAN Cell Global Identity (ECGI) to which the terminal was connected just before the RLF or frequency/PCI; and in the case of HOF, an ECGI of a target cell of a handover that starts when the HOF occurs or frequency/PCI;

ECGI of a cell in which the reestablishment has been attempted;

ECGI of a source cell of a handover that has lastly occurred;

Time taken from the start of a handover that has lastly occurred to the connection failure occurrence;

Kind of connection failure, that is, RLF or HOF;

Reference signal measurement result for one or more cells;

In the case of RLF, C-RNTI of the terminal used in the cell to which the terminal was connected just before the RLF; and in the case of HOF, C-RNTI of the terminal used in a source cell of a handover that starts when the HOF occurs;

RLF cause; and

Time taken from the connection failure occurrence to the transfer of the RLF report to the RAP.

Table 1 below shows suitable classification of signal flow for the MRO measurement process in accordance with various cases as described above.

TABLE 1

| | RAP that becomes a reestablishment target receives RLF report. | RAP that is not a reestablishment target receives RLF report. | Any RAP does not receive RLF report. |
|---|---|---|---|
| Reestablishment Success | Situation S1 FIG. 4A | Situation S2 FIG. 4B | Situation S3 FIG. 4A (Operation 430 omitted) |
| Reestablishment Failure A | Situation A1 FIG. 4C (RAP 120y and RAP 120y' are the same) | Situation A2 FIG. 4C | Situation A3 FIG. 4C (Operations 460 and 470 omitted) |
| Reestablishment Failure B | Situation B1 FIG. 4C (RAP 120y and RAP 120y' are the same) | Situation B2 FIG. 4C | Situation B3 FIG. 4C (Operations 460 and 470 omitted) |
| Reestablishment Failure C | Situation C1 FIG. 4C (Operation 440 omitted, RAP 120y and RAP 120y' are the same) | Situation C2 FIG. 4C (Operation 440 omitted) | Situation C3 Connection failure information is not available in any RAP, and it is impossible to perform MRO measurements. |

Hereinafter, signal flow in accordance with FIGS. 4A, 4B, and 4C will be described in detail.

FIG. 4A

At operation 400, the terminal 100 experiences the connection failure (RLF or HOF). If the connection failure is RLF, the RAP 120x refers to a RAP that includes a cell that served the terminal 100 just before the RLF. If the connection failure is HOF, the RAP 120x refers to a RAP that includes a source cell of a handover that starts when the HOF occurs. The terminal 100 that has experienced the connection failure, at operation 410, sends a reestablishment request message to the RAP 120y. The reestablishment request message may correspond to an RRCConnectionReestablishmentRequest message.

At operation 420, the terminal 100 and the RAP 120y may successfully perform the remaining process of the reestablishment to be connected to each other as a result. When performing the remaining process of the reestablishment, the terminal 100 may transmit an indicator indicating that the RLF report is available in the terminal 100 to the RAP. The indicator may indicate that the terminal 100 stores RLF report related information and can transmit the RLF report. In this case, a message for transferring the indicator may be an RRCConnectionReestablishinentComplete message.

The RAP 120y that has received the indicator may or may not transmit a message for requesting RLF report transmission to the terminal 100.

In the case of receiving the message for requesting the RLF report transmission from the RAP 120y, the terminal 100 may transmit the RLF report at operation 430. The RAP 120y may receive the RLF report from the terminal 100. The RLF report may include information for the MRO measurements. Accordingly, the RAP 120y may possess the information for the MRO measurements in relation to the terminal 100. The RAP 120y may possess information (information for the MRO measurements) included in the reestablishment request message that is received through at least operation 410, and additionally in the case of requesting the RLF report, the RAP 120y may possess the information (information for the MRO measurements) included in the RLF report. Here, a case where the RAP 120y receives the RLF report may correspond to situation S1 of Table 1, and a case where the RAP 120y does not receive the RLF report may correspond to situation S3 of Table 1.

At operation 440, the RAP 120y may construct a message for notifying of the connection failure using the information for the MRO measurements possessed in relation to the terminal 100 and may transfer the message to the RAP 120x. In this case, the message for notifying of the connection failure may not be directly transferred from the RAP 120y to the RAP 120x, but may be transferred through an RLF indication message.

At operation 480, the RAP 120x that has received the message for notifying of the connection failure through the previous operation may perform MRO operation on the basis of the received message. Further, if there is another RAP which becomes the target that requires recognition of the connection failure, the RAP 120x that has received the message for notifying of the connection failure through the previous operation may additionally notify the RAP of the information on the connection failure. In this case, a message for transferring the message for notifying of the connection failure may be a handover report message.

FIG. 4B

Operations 400 to 420 may follow the operations 400 to 420 as described above with reference to FIG. 4A. The RAP 120y may not request the RLF report from the terminal 100 that has requested the RLF report transmission, and thus may not receive the RLF report. At operation 440, the RAP 120y may construct the message for notifying of the connection failure using the information for the MRO measurements related to the terminal 100 that is obtained through the reestablishment request message at operation 4120, and may transfer the message to the RAP 120x. In this case, the message for notifying of the connection failure may not be directly transferred from the RAP 120y to the RAP 120x, but may be transferred through one or more entities. If the message is directly transferred, the message for notifying of the connection failure may be transferred through an RLF indication message.

At operation 450, the terminal 100 may be handovered to a cell in another RAP 120y'. In the drawing, signaling for a handover is quite simply illustrated with many parts thereof omitted. The signaling for a handover may follow an S1-based handover process that is defined in 3GPP and/or X2-based handover process. In this case, the terminal 100 may transmit an indicator indicating that the RLF report is available in the terminal. The indicator may indicate that the terminal 100 stores RLF report related information and can transmit the RLF report. For example, the terminal 100 may transfer the indicator to the RAP 120$y'$ through an RRCConnectionReconfigurationComplete message. Accordingly, the terminal 100 may be in a state where it is connected to the cell in the RAP 120$y'$ at operation 455.

At operation 460, the RAP 120$y'$ that has received the indicator indicating that the RLF report is available may request the terminal 100 to transmit the RLF report. The terminal 100 may transfer the RLF report on the basis of the RLF report transmission request from the RAP 120$y'$.

At operation 470, the RAP 120$y'$ may construct a message for notifying of the connection failure using the information for the MRO measurements related to the terminal 100 that is obtained through the RLF report at operation 460, and may transfer the message to the RAP 120$x$. In this case, the message for notifying of the connection failure may not be directly transferred from the RAP 120$y'$ to the RAP 120$x$, but may be transferred through one or more entities. If the message is directly transferred, the message for notifying of the connection failure may be transferred through an RLF indication message.

At operation 480, the RAP 120$x$ that has received the message for notifying of the connection failure through the previous operation may perform MRO operation on the basis of the received message. Further, if there is another RAP which becomes the target that requires recognition of the connection failure, the RAP 120$x$ that has received the message for notifying of the connection failure through the previous operation may additionally notify the RAP of the information on the connection failure. In this case, a message for transferring the message for notifying of the connection failure may be a handover report message.

The operation 480 may be immediately performed after operation 440. However, it may be more ideal that the operation 480 is performed only once thereafter. With respect to one connection failure event, the RAP 120$x$ receives twice the message for notifying of the connection failure through operations 440 and 470, and thus it may be misjudged that the corresponding connection failure occurs unnecessarily frequently. In order to solve this, the RAP 120$x$ that has received the message at operation 440 may count only one connection failure with respect to one connection failure event. For example, the RAP 120$x$ may recognize that the RLF indication message has been received twice with respect to one connection failure event using at least one of information of the terminal 100 (e.g., C-RNTI and/or release number), existence/nonexistence of the RLF report included in the RLF indication message, and an RRC Conn Setup Indicator Information Element (IE) included in the RLF indication message. Through this, only one failure event can be counted, and an HO report may be transmitted after the final message for notifying of the connection failure is received at operation 470.

The above explanation with respect to FIG. 4B refers to the signal flow that corresponds to the situation S2 in Table 1.

FIG. 4C

Operations 400 to 410 may follow the operations 400 to 410 as described above with reference to FIG. 4A. At operation 415, reestablishment may not be successfully performed between the RAP 120$y$ and the terminal 100 (reestablishment failure). More specifically, the reestablishment failure may correspond to reestablishment failure A (situations A1, A2, and A3 in Table 1), reestablishment failure B (situations B1, B2, and B3 in Table 1), or reestablishment failure C (situations C1, C2, and C3 in Table 1).

At operation 420, the terminal 100 that has not succeeded in the reestablishment may make a connection to a cell in the RAP 120$y'$. In this case, the terminal 100 may transfer an indicator indicating that the RLF report is available in the terminal 100 to the RAP 120$y'$. The indicator may indicate that the terminal 100 stores the RLF report related information and can transmit the RLF report. Here, the RAP 120$y$ and the RAP 120$y'$ may be the same RAPs (situations A1, B1, and C1 in Table 1).

On the other hand, in the case of the reestablishment failure A and/or B, since the RAP 120$y$ has received a reestablishment request message from the terminal 100, it may transmit a message for notifying of the connection failure to the RAP 120$x$ at operation 440. The RAP 120$y$ may construct an RLF indication message on the basis of information that is obtained from the reestablishment request message, and may transmit the RLF indication message to the RAP 120$x$ (situations A1, A2, A3, B1, B2, and B3 in Table 1). In the case of the reestablishment failure C, the RAP 120$y$ is unable to transfer the RLF indication message to the RAP 120$x$ (situations C1, C2, and C3 in Table 1).

Returning again to the time when the terminal 100 and the RAP 120$y'$ make a connection to each other at operation 420, the terminal 100 may transmit an indicator indicating that the RLF report is available in the terminal to the RAP 120$y'$. The indicator may indicate that the terminal 100 stores RLF report related information and can transmit the RLF report. The RAP 120$y'$ that has received the indicator indicating that the RLF report is available may or may not request the terminal 100 to transmit the RLF report. A case where the terminal 100 transmits the RLF report at operation 460 may correspond to the situations A1, A2, B1, B2, C1, and C2 in Table 1. In contrast, a case where the terminal 100 does not transmit the RLF report may correspond to the situations A3, B3, and C3. If the terminal does not transmit the RLF report, operations 460 and 470 in FIG. 4C are omitted.

At operation 470, the RAP 120$y'$ may construct a message for notifying of the connection failure using the information for the MRO measurements related to the terminal 100 that is obtained through the RLF report at operation 460, and may transfer the message to the RAP 120$x$. In this case, the message for notifying of the connection failure may not be directly transferred from the RAP 120$y'$ to the RAP 120$x$, but may be transferred through one or more entities. If the message is directly transferred, the message for notifying of the connection failure may be transferred through an RLF indication message.

At operation 480, the RAP 120$x$ that has received the message for notifying of the connection failure through the previous operation may perform MRO operation on the basis of the received message. Further, if there is another RAP which becomes the target that requires recognition of the connection failure, the RAP 120$x$ that has received the message for notifying of the connection failure through the previous operation may additionally notify the RAP of the information on the connection failure. A message that is used in this case may be a handover report message.

The operation 480 may be immediately performed after operation 440. However, it may be more ideal that the operation 480 is performed only once thereafter. With respect to one connection failure event, the RAP 120$x$ receives twice the message for notifying of the connection failure through operations 440 and 470, and thus it may be misjudged that the corresponding connection failure occurs unnecessarily frequently. In order to solve this, the RAP 120x that has received the message at operation 440 may count only one connection failure with respect to one connection failure event. For example, the RAP 120x may recognize that the RLF indication message has been received twice with respect to one connection failure event using at least one of information of the terminal 100 (e.g., C-RNTI and/or release number), existence/nonexistence of the RLF report included in the RLF indication message, and an RRC Conn Setup Indicator Information Element (IE) included in the RLF indication message. Through this, only one failure event can be counted, and an HO report may be transmitted after the final message for notifying of the connection failure is received at operation 470.

The RLF indication message as described above with reference to FIGS. 4A to 4C may include one or more pieces of information as follows:

PCI of a cell to which the terminal was connected just before the connection failure;

ECGI of a cell in which the reestablishment has been attempted

C-RNTI used in a cell to which the terminal was connected just before the connection failure;

Short MAC-I;

RLF report;

Indicator indicating whether the RLF report is received after Radio Resource Control (RRC) layer connection establishment or after handover (RRC Conn Setup Indicator IE); and Reestablishment cause.

In the case of the RLF, the cell to which the terminal was connected just before the connection failure as described above means a serving primary cell just before the RLF, and in the case of the HOF, the cell means a source primary cell at the time of the HOF occurrence. The RAP 120x that has received the RLF report may analyze the cause of the corresponding connection failure using the above-described information and information on the terminal 100 that is identified by the possessed C-RNTI. Further, if there is a RAP that requires the information on the connection failure in addition to the RAP 120x itself, the RAP 120x may transfer a handover report message to the corresponding RAP.

According to the MRO measurement signal flow in the related art, information on the result of the reestablishment attempt is not transferred. The MRO measurements are performed under the assumption that the cell that becomes the reestablishment request target is a cell that is suitable to serve the terminal 100 at the time of the connection failure. For example, if the reestablishment has not been properly completed, this assumption may not be effective. Accordingly, it is necessary to take the MRO measurements in a different manner in accordance with the result of the reestablishment attempt. For example, if the reestablishment has succeeded, the existing MRO measurements are taken, whereas if the reestablishment has not been properly completed, it is vague to determine which cell is most suitable to serve the terminal 100 at the time of the connection failure, and thus it may be necessary not to handle the information as information to be used to control the mobility parameter.

Simply speaking, if the cell in which the reestablishment has been attempted is a cell that is suitable to serve the terminal 100 at the time of the connection failure, it is proper that the corresponding connection failure related information is considered as an input for the mobility parameter control through the MRO measurements using the connection failure related information. However, if the cell in which the reestablishment has been attempted is not the cell that is suitable to serve the terminal 100 at the time of the connection failure, it is not ideal to use the corresponding connection failure related information in controlling the mobility parameter control. In an embodiment of the present disclosure, the cell in which the reestablishment has been attempted and which is suitable to serve the terminal 100 at the time of the connection failure may be one of the following cells:

Cell that becomes the target of reestablishment attempt when the result of the reestablishment attempt is successful;

Cell that becomes the target of reestablishment attempt when the result of the reestablishment attempt is successful and/or is failure A; and Cell that becomes the target of reestablishment in situation(s) which include situation S1, but do not include situation C2 among situations presented in Table 1.

More accurately, the situations which include situation S1, but do not include situation C2 among the situations presented in Table 1 may mean situation S1 and situation A1. As can be known from the above-described example, various references may be provided in determining whether the cell in which the reestablishment has been attempted is the cell that is suitable to serve the terminal 100 at the time of the connection failure. In the present disclosure, such references are not limited, but in determining which reference is the most suitable reference, it may be most suitable to determine that the cell in which the reestablishment has been attempted in situations S1 and A1 is suitable to serve the terminal 100 at the time of the connection failure. This is because if the reestablishment has been completed, that is, the reestablishment has succeeded or failed (reestablishment success and reestablishment failure A), it may be determined that there is no problem in performing communication between the corresponding cell and the terminal 100 (in the case of the failure, it may be simply considered that the RAP 120y that includes the corresponding cell does not have a terminal context). If the terminal 100 moves to another cell as fast as the RAP 120y that includes the reestablishment target cell cannot receive the RLF report, it may be determined that the corresponding cell is not suitable.

According to an embodiment of the present disclosure, the RAP 120y that becomes the reestablishment request target can transmit the RLF indication message only in the case where the reestablishment has succeeded. In other words, the RAP 120y may not transmit the RLF indication message if the reestablishment has failed (including reestablishment failures A, B, and C). Table 2 presents whether the RLF indication message is transferred in respective situations according to this embodiment.

TABLE 2

|  | RAP that becomes a reestablishment target receives RLF report. | RAP that is not a reestablishment target receives RLF report. | Any RAP does not receive RLF report. |
|---|---|---|---|
| Reestablishment Success | Situation S1 RAP 120y transfers RLF indication message. | Situation S2 RAP 120y transfers RLF indication message. RAP 120y' transfers RLF indication message. | Situation S3 RAP 120y transfers RLF indication message. |
| Reestablishment Failure A | Situation A1 RAP 120y can transfer RLF indication message, but does not transfer the message. RAP 120y' = 120y transfers RLF indication message. | Situation A2 RAP 120y can transfer RLF indication message, but does not transfer the message. RAP 120y' transfers RLF indication message. | Situation A3 RLF indication message is not transferred. |
| Reestablishment Failure B | Situation B1 RAP 120y can transfer RLF indication message, but does not transfer the message. RAP 120y' = 120y transfers RLF indication message. | Situation B2 RAP 120y can transfer RLF indication message, but does not transfer the message. RAP 120y' transfers RLF indication message. | Situation B3 RLF indication message is not transferred. |
| Reestablishment Failure C | Situation C1 RAP 120y' = 120y transfers RLF indication message. | Situation C2 RAP 120y' transfers RLF indication message. | Situation C3 RLF indication message is not transferred. |

According to another embodiment of the present disclosure, the RAP 120y that becomes the reestablishment request target can transmit the RLF indication message only in the case where the reestablishment has been completed. In other words, the RAP 120y may not transmit the RLF indication message if the reestablishment has not been completed (including reestablishment failures B and C). Table 3 presents whether the RLF indication message is transferred in respective situations according to this embodiment.

Two embodiments as described above may be properly taken in accordance with the importance of detection. If it is determined that the reestablishment success/failure is more useful to the MRO measurements, the former method (Table 2) may be used, whereas if it is determined that the reestablishment completion (success and failure A)/incompletion is more useful to the MRO measurements, the latter method (Table 3) may be used. In other words, in the case of following Table 2, it is determined that the cell that is

TABLE 3

|  | RAP that becomes a reestablishment target receives RLF report. | RAP that is not a reestablishment target receives RLF report. | Any RAP does not receive RLF report. |
|---|---|---|---|
| Reestablishment Success | Situation S1 RAP 120y transfers RLF indication message. | Situation S2 RAP 120y transfers RLF indication message. RAP 120y' transfers RLF indication message. | Situation S3 RAP 120y transfers RLF indication message. |
| Reestablishment Failure A | Situation A1 RAP 120y transfers RLF indication message. RAP 120y' = 120y transfers RLF indication message. | Situation A2 RAP 120y transfers RLF indication message. RAP 120y' transfers RLF indication message. | Situation A3 RAP 120y transfers RLF indication message. |
| Reestablishment Failure B | Situation B1 RAP 120y can transfer RLF indication message, but does not transfer the message. RAP 120y' = 120y transfers RLF indication message. | Situation B2 RAP 120y can transfer RLF indication message, but does not transfer the message. RAP 120y' transfers RLF indication message. | Situation B3 RLF indication message is not transferred. |
| Reestablishment Failure C | Situation C1 RAP 120y' = 120y transfers RLF indication message. | Situation C2 RAP 120y' transfers RLF indication message. | Situation C3 RLF indication message is not transferred. | suitable to serve the terminal 100 at the time of the connection failure is the cell that becomes the target of the reestablishment attempt when the result of the reestablishment attempt is successful. In the case of following Table 3, it is determined that the cell that is suitable to serve the terminal 100 at the time of the connection failure is the cell that becomes the target of the reestablishment attempt when the result of the reestablishment attempt is successful and/or is failure A. Further, the case that follows Table 2 may also be a case for simply recognizing whether the reestablishment has succeeded.

In the above-described embodiment, it has been considered to modify a method for transferring the RLF indication message so as to discriminate the reestablishment success/failure or reestablishment completion/incompletion. In accordance with still another reference, a method for constructing the RLF indication message may also be considered so as to discriminate, for example, situations S1 and A1 from other situations.

According to an embodiment of the present disclosure, in the situations S1 and A1 (in which the RLF report has been received), the RLF indication message that includes the RLF report may be transferred to the RAP 120x. However, even in other situations (e.g., situations S2, A2, B2, and C2), the RLF indication message that includes the RLF report can be transferred to the RAP 120x, and thus it is difficult to detect the situations S1 and A1 from the case where the RLF indication message that includes the RLF report has been received. On the other hand, information indicating that the RLF report reception is performed after the reestablishment failure or in another cell that is different from the cell in which the reestablishment has been attempted may be included in the RLF indication message. For example, an RRC Conn Setup Indicator IE that may be included in the RLF indication message is an indicator indicating that the RLF report reception is performed after the reestablishment failure or in another cell that is different from the cell in which the reestablishment has been attempted.

Accordingly, if the RLF report is transferred through the RLF indication message in the situation S1, the RRC Conn Setup Indicator IE is not included in the RLF indication message. However, if the RLF report is transferred through the RLF indication message in other situations, the RRC Conn Setup Indicator IE is included in the RLF indication message.

Summing up the above-described information, since the situation S1 can be discriminated from the RRC Conn Setup Indicator IE that is included in the RLF report when the RLF report is transferred, an operation is required to additionally discriminate the situation A1 from other situations. Accordingly, the RAP 120y' that has received the RLF report may check whether the cell that becomes the reestablishment target and the cell that has received the RLF report coincide with each other when transmitting the RLF indication message, and if they coincide with each other, the RAP 120y' may determine that this case corresponds to the situation A1, and may operate or modify the RLF indication message differently from the existing manner to transmit the RLF indication message. In other cases, the existing RLF indication message transferring method may be used.

In addition, time information taken from the time when the connection failure occurred to the time when the RLF report was transmitted and/or stored information for the reestablishment result may be additionally considered. For example, if the cell 120y and the cell 120y' that has received the RLF report coincide with each other, it may be considered as time information taken from the time when the connection failure occurred to the time when the RLF report was transmitted. If a difference between the time when the RLF report was received and the connection failure time is shorter than a predetermined period, it may be determined that this case corresponds to the situation A1, and the RLF indication message may be operated to be transmitted. The method for differently operating and transmitting the RLF indication message as described above may include one of the followings:

RRC Conn Setup Indicator IE is not included;

RRC Conn Setup Indicator IE is included, and at least one of failure cell PCI IE, reestablishment cell ECGI E, C-RNTI IE, and short MAC-I IE is operated in an agreed manner between RAPs; and New indicator that notifies of the situation A1 is included.

In the related art, the RAP 120x that has received the RLF indication message including the RRC Conn Setup Indicator IE has disregarded the failure cell PCI IE, reestablishment cell ECGI IE, C-RNTI IE, and short MAC-I IE. However, if at least one of the failure cell PCI IE, reestablishment cell ECGI IE, C-RNTI IE, and short MAC-I IE is operated in the agreed manner between the RAPs, and is used as a scheme for notifying of the situation A1, at least one of the IEs may not be disregarded and may be used to determine the situation A1, and more generally, to determine whether the reestablishment cell is suitable.

If a method for including a new indicator is used, this indicator may be used for the purpose of, for example, notifying or suggesting that the cell that has received the RLF report from the RAP 120x and the reestablishment cell are the same (or different from each other) or further, suitability of the reestablishment cell.

Depending on whether the RRC Conn Setup Indicator IE is included (if included, the reestablishment cell is unsuitable, whereas if not, suitable), the RAP 120x may determine whether the reestablishment cell is suitable depending on whether at least one of the failure cell PCI IE, reestablishment cell ECGI IE, C-RNTI 1E, and short MAC-I IE is operated in the agreed manner between the RAPs (if operated in the agreed manner, the reestablishment cell is suitable, whereas if not, unsuitable), or whether a new indicator is included (if it is notified or suggested that the indicator is suitable, the reestablishment cell is suitable, whereas if not, unsuitable).

The situation A1 may be developed in an aspect that is different from the above-described situation. Referring to FIG. 4C, if the terminal 100 requests the reestablishment from the RAP 120y at operation 410, the RAP 120y may not simply reject this, but may implement a mechanism for fetching context from the RAP 120x. In this case, after the RAP 120y receives the context from the RAP 120x, the situation A1 may follow from operation 420 of FIG. 4A. Since it is not necessary to consider the situation A1 in the RAN 130 in which the context fetch is performed (the situation becomes similar to the situation S1), the RAP 120x may gasp that the context fetch mechanism is implemented (e.g., if the RLF indication message having no RLF report is received, terminal context is set to be transmitted through a handover request message), and if the RLF report is included in the RLF indication message, it is confirmed whether the RRC Conn Setup Indicator IE is included therein. If the IE is not included, it may be determined that the cell that becomes the target of the reestablishment attempt is the cell that is suitable to serve the terminal 100 at the time of the connection failure, whereas otherwise, it may be determined that the cell is not suitable.

Through the embodiments, when the suitability of the reestablishment cell is determined, the signal strength measurement result that is included in the RLF report in the RLF indication message may be additionally considered.

Figure 5:
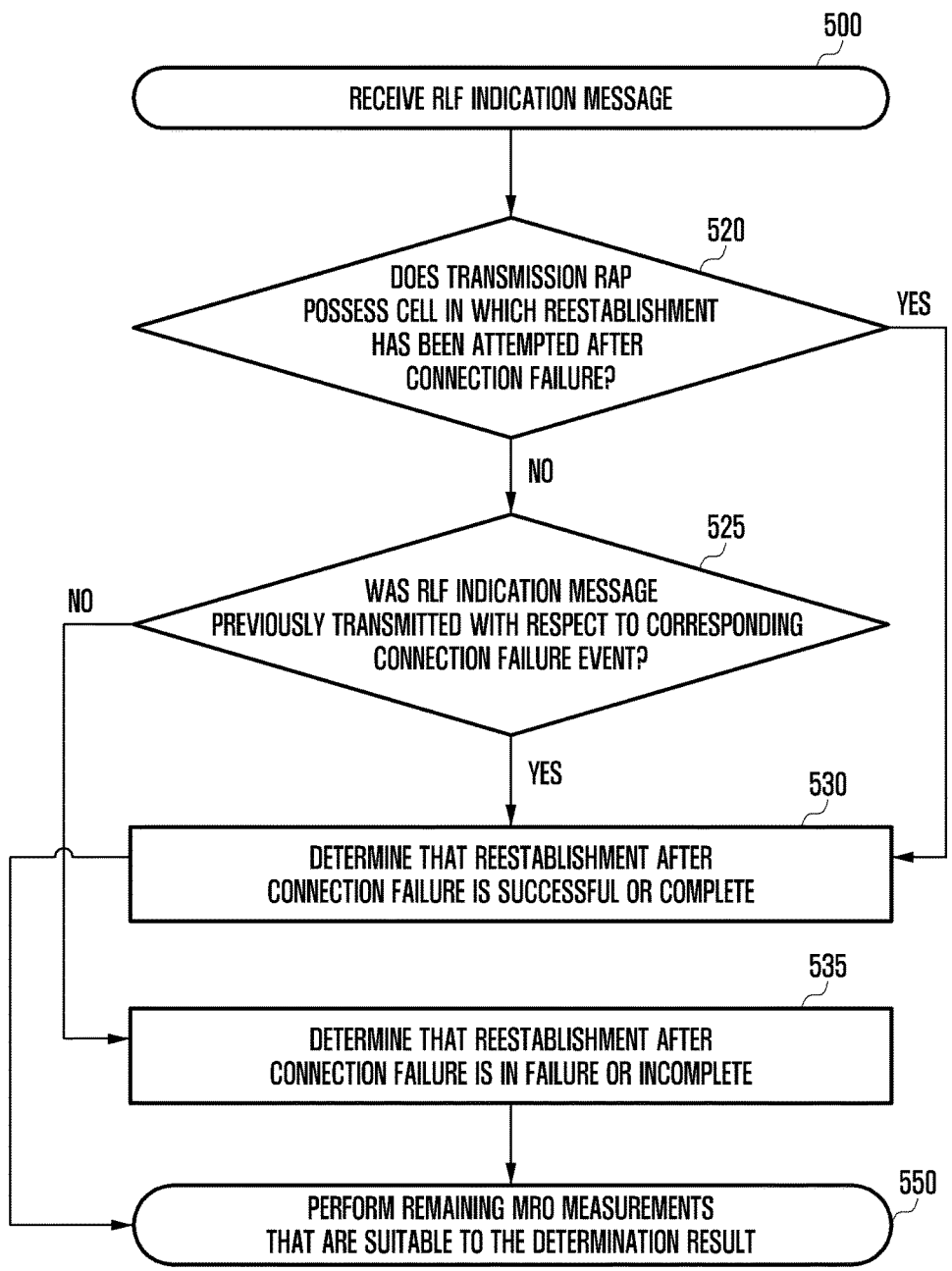
FIG. 5 is a flowchart illustrating an operation of a RAP 120$x$ that has received an RLF indication message according to an embodiment of the present disclosure.

FIG. 5 is a flowchart illustrating the operation of RAP 120x that has received an RLF indication message according to an embodiment of the present disclosure.

This embodiment may be commonly applied to the two embodiments as described above. This embodiment basically aims to determine whether the reestablishment has succeeded or has been completed depending on what RAP 120y or 120y' the RLF indication message is received from with respect to one connection failure event:

If the RLF indication message is received from the RAP 120y in which the reestablishment has been attempted, it is considered that the reestablishment has succeeded or has been completed. In this case, the RLF indication message is received from both the RAP 120y in which the reestablishment has been attempted and the RAP 120y' in which the reestablishment has not been attempted. If the RLF indication is received only from the RAP 120y, it is apparent that the cell in which the reestablishment has been attempted can be considered as the cell that is suitable to serve the terminal at the time of the RLF. However, in the case where the RLF indication message is received from both the RAP 120y and the RAP 120y', the terminal has been handovered to another RAP 120y' or has attempted the RRC connection not much later than the time when the reestablishment succeeded or was completed, and thus it is reasonable that the cell in which the reestablishment has been attempted is unable to be considered as the cell that is suitable to serve the terminal at the time of the RLF.

If the RLF indication message is received only from the RAP 120y' in which the reestablishment has not been attempted, it is considered that the reestablishment has failed or has been unfinished. In this case, it is reasonable that the cell in which the reestablishment has been attempted is unable to be considered as the cell that is suitable to serve the terminal at the time of the RLF.

On the other hand, the RLF indication message may be constructed as follows from the RAP 120y and/or 120y' that transmits the RLF indication message:

In the case of constructing the RLF indication from the RLF report, the RLF report is included in the RLF indication message.

RRC Conn Setup Indicator IE is included when the RLF report is obtained after RRC connection establishment or successful handover, and has a value that is called "RRC Conn Setup".

With reference to the above-described construction method, it may be determined what RAP the RAP that has sent the RLF indication message is as in Table 4 below.

TABLE 4

| | RLF report is included. | RLF report is not included. |
|---|---|---|
| RRC Conn Setup Indicator IE, is not included. | Sent by RAP 120y | Sent by RAP 120y |
| RRC Conn Setup Indicator IE is included. | Sent by RAP 120y' | Non-occurrence |

Hereinafter, the operation of the RAP 120x according to this embodiment will be described with reference to FIG. 5.

FIG. 5 is a flowchart illustrating the operation of the RAP 120x that has received the RLF indication message according to an embodiment of the present disclosure.

At operation 500, the RAP 120x receives the RLF indication message. The processing may proceed to operation 520.

At operation 520, the RAP 120x may determine what RAP the RAP that has sent the RLF indication message is. The RAP 120x may grasp the attribute of the RAP that has sent the RLF indication message on the basis of the received RLF indication message. The RAP attribute may implicitly or explicitly indicate what RAP the RAP that has sent the RLF indication message is.

More specifically, it is possible to grasp whether the RAP that has sent the RLF indication message is:

RAP 120y in which the terminal 100 has attempted the reestablishment after the connection failure (in this case, the RAP 120y may receive up to the RLF report); or RAP 120y' which has simply received the RLF report from the terminal 100 other than the RAP 120y in which the terminal 100 has attempted the reestablishment after the connection failure.

The grasping method may follow the method of Table 4. In other words, if the RLF indication message includes:

RLF report, and the RRC Conn Setup Indicator IE is not included therein, it may be determined that the RLF indication message has been sent by the RAP 120y. Since an additional RLF indication message is not to be received, it may not necessary to store the context for the corresponding terminal 100 any more for the purpose of the MRO measurements. Further, the MRO measurements can be immediately performed on the basis of the RLF indication message that is received from the RAP 120y. It may be determined that this case corresponds to the situation S1. The processing may proceed to operation 530;

RLF report, and the RRC Conn Setup Indicator IE is set to "RRC Conn Setup" and is included therein, it may be determined that the RLF indication message has been sent by the RAP 120y'. It may be determined that this case corresponds to the situations S2, A1, A2, B1, B2, C1, and C2. In order to determine whether the case corresponds to {situation S2} or {situations A1, A2, B1, B2, C1, C2} on the basis of Table 2, or in order to determine whether the case corresponds to {situations S2, A1, A2} or {situations B1, B2, C1, C2} on the basis of Table 3, the processing may proceed to operation 525; or no RLF report, and the RRC Conn Setup Indicator IE is not included therein, it may be determined that the RLF indication message has been sent by the RAP 120y. Since the RAP 120y' that has received the RLF report can additionally transmit the RLF indication message, information that is included in the RLF indication message and context for the corresponding terminal can be stored. The processing may proceed to operation 530.

More simply, in accordance with the existence/nonexistence of the RRC Conn Setup Indicator IE, it can be determined whether the RLF indication message has been sent by the RAP 120y (the RRC Conn Setup Indicator IE exists) or the RAP 120y' (the RRC Conn Setup Indicator IE does not exist). If the determination is made simply depending on the existence/nonexistence of the RRC Conn Setup Indicator IE, it becomes impossible to discriminate between the situation S1 and {situation S2 and/or situation A1 and situation A2}. If so, it has the advantage that the implementation is facilitated, but it also has the disadvantage that it is necessary to maintain the context for the terminal 100 for a longer time than it needs. In the situation S1, there is not RAP that will further transmit the RLF indication message with respect to the corresponding connection failure event, and thus the MRO measurements can be immediately performed after the RLF indication message is once received. Further, since the RLF indication message will not be additionally received with respect to the corresponding connection failure, it is not required to maintain the context related to the corresponding terminal 100 for the operation 525. Accordingly, during implementation, it is necessary to make up an algorithm through well grasping of the advantage/disadvantage thereof At operation 525, the RAP 120x can determine whether the RLF indication message has ever been received with respect to the corresponding connection failure event. If so, the processing proceeds to operation 530, whereas if not, the processing proceeds to operation 535.

At operation 530, the RAP 120x determines that the result of the reestablishment that was attempted after the corresponding connection failure has succeeded or has been completed, and proceeds to operation 550.

At operation 535, the RAP 120x determines that the result of the reestablishment that was attempted after the corresponding connection failure has failed or has been unfinished, and proceeds to operation 550.

At operation 550, the remaining MRO measurements that are suitable in accordance with the corresponding result of the determination are performed.

A simple embodiment that is derived from the above-described embodiment will be described as follows:

If the result of the reestablishment is in failure or incomplete, the RAP 120y that possesses the cell in which the reestablishment has been attempted may set not to transmit the RLF indication message.

if at least one RLF indication message that is detonated by the same connection failure event does not include the RRC Conn Setup Indicator 1E, the RAP 120x that has received the RLF indication message may determine that the result of the reestablishment is successful or complete.

According to the above-described embodiment, the RAP 120x can analogize the result of the reestablishment for the connection failure event in which the RLF indication message that includes the RRC Conn Setup Indicator IE has been transferred.

According to an embodiment of the present disclosure to which the above-described embodiment is applied, The RAP 120y may directly notify the RLF indication message of the result of the reestablishment. Table 5 indicates division of the RLF indication message transfer according to an embodiment of the present disclosure.

TABLE 5

| | RAP that becomes a reestablishment target receives RLF report. | RAP that is not a reestablishment target receives RLF report. | Any RAP does not receive RLF report. |
|---|---|---|---|
| Reestablishment Success | Situation S1 RAP 120y transfers RLF indication message that includes the reestablishment result. | Situation S2 RAP 120y transfers RLF indication message that includes the reestablishment result. RAP 120y' transfers RLF indication message. | Situation S3 RAP 120y transfers RLF indication message that includes the reestablishment result. |
| Reestablishment Failure A | Situation A1 RAP 120y transfers RLF indication message that includes the reestablishment result. RAP 120y' = 120y transfers RLF indication message. | Situation A2 RAP 120y transfers RLF indication message that includes the reestablishment result. RAP 120y' transfers RLF indication message. | Situation A3 RAP 120y transfers RLF indication message that includes the reestablishment result. |
| Reestablishment Failure B | Situation B1 RAP 120y transfers RLF indication message that includes the reestablishment result. RAP 120y' = 120y transfers RLF indication message. | Situation B2 RAP 120y transfers RLF indication message that includes the reestablishment result. RAP 120y' transfers RLF indication message. | Situation B3 RAP 120y transfers RLF indication message that includes the reestablishment result. |
| Reestablishment Failure C | Situation C1 RAP 120y' = 120y transfers RLF indication message. | Situation C2 RAP 120y' transfers RLF indication message. | Situation C3 RLF indication message is not transferred. |

Except for the situation that corresponds to the reestablishment failure C, the RAP 120x may be notified of the result of the reestablishment through the RLF indication message. In the situation that corresponds to the failure C, the RAP 120x receives only the RLF indication message that does not include the result of the reestablishment that is sent from the RAP 120y'. In this case, the RAP 120x may recognize that the result of the reestablishment is in failure or incomplete, and more specifically, that the result of the reestablishment corresponds to the failure C. In the situation C3, information on the connection failure is not transferred to anywhere, and the RAP 120x disregards the information.

In summary:

The RAP 120y may transfer the RLF indication message that includes the result of the reestablishment.

The RAP 120x may determine the result of the reestablishment on the basis of the RLF indication message that includes the result of the reestablishment.

The RAP 120x may determine that the result of the reestablishment is in failure or incomplete, and more specifically, that the result of the reestablishment corresponds to the failure C, with respect to the connection failure in which only the RLF indication message that does not include the result of the reestablishment has been transferred.

The result of the reestablishment may have at least one of the following values:

Reestablishment success: This may refer to a reestablishment success.

Reestablishment failure: This may refer to at least one of reestablishment failures A and B.

Reestablishment incompleteness: This may refer to the reestablishment failure B.

Reestablishment completeness: This may refer to at least one of the reestablishment failure A and the reestablishment success.

Reestablishment reject: This may refer to the reestablishment failure A.

Through the above-described various embodiments, the RAP 120x may determine suitability of the reestablishment cell. As described above, the suitable reestablishment cell may refer to at least one of the followings:

Cell that becomes the target of reestablishment attempt when the result of the reestablishment attempt is successful;

Cell that becomes the target of reestablishment attempt when the result of the reestablishment attempt is successful and/or is failure A; and Cell that becomes the target of reestablishment target in the situation(s) which include at least the situation S1 and does not include the situation C2 among the situations presented in Table 1.

If the RAP that does not properly set the mobility parameter and thus becomes the cause of the connection failure is the RAP 120x that has received the RLF indication message, an additional signaling between RAPs may not be necessary, whereas if not, the additional signaling between the RAPs is necessary. For this, a handover report message has been defined. Using at least one method as described above in the embodiments of the present disclosure, the RAP 120x may make the handover report message include the result of the reestablishment. The result of the reestablishment may have at least one of the following values:

Reestablishment success: This may refer to a reestablishment success.

Reestablishment failure: This may refer to at least one of reestablishment failures A, B, and C.

Reestablishment incompleteness: This may refer to at least one of the reestablishment failures B and C.

Reestablishment completeness: This may refer to at least one of the reestablishment failure A and the reestablishment success.

Reestablishment reject: This may refer to the reestablishment failure A.

Reestablishment cell is unsuitable.

Reestablishment cell is suitable.

The above-described reestablishment result values are different from the reestablishment result values that can be included in the RLF indication message as described above on the point that the values of "reestablishment failure" and "reestablishment incompleteness" may also include the case of the reestablishment failure C. According to this embodiment of the present disclosure, the RAP 120x, unlike the RAP 120y, can sense the case of the failure C.

If even the handover report message is changed, or is not changed to indicate the result of the reestablishment, the RAP that has received the handover report message or the RAP 120x that has received the RLF indication message may transfer at least one of the followings to an entity (that may be a server) that participates in the performance management:

The rate of connection failure after which the result of the reestablishment is successful, The rate of connection failure after which the result of the reestablishment is in failure, The rate of connection failure after which the result of the reestablishment is complete, and The rate of connection failure after which the result of the reestablishment is incomplete.

Since it is determined to what extent the reestablishment result information is transferred after the final connection failure depending on whether the handover report message has been changed, the RAP that notifies the entity that participates in the performance management of the information may differ accordingly.

The RAP 120x that has received the RLF indication message and/or the RAP that has received the handover report message may manage their counters in accordance with the kind of problems (TLH, TEH, or HWC), in accordance with the relationship between the source/target cells (TEH and HWC) that correspond to the respective problems (in the case of the TLH, the serving cell/reestablishment cell at the time of the RLF), and/or additionally in accordance with the suitability of the reestablishment. An example of the TEH problem is indicated in Table 6. The counter can be managed in a similar manner even with respect to the HWC problem.

TABLE 6

| | Cell a cell b | Cell a cell c | Cell a cell d |
|---|---|---|---|
| Reestablishment cell is suitable (e.g., reestablishment is successful or completed, or corresponds to situations S1 and A1) | Counter value = No. 43 | Counter value = No. 23 | Counter value = No. 69 |
| Reestablishment cell is unsuitable. | Counter value = No. 1 | Counter value = No. 4 | Counter value = No. 8 |

One dimension may be further added to the TLH problem. This corresponds to a case where the signal strength in the serving cell at the time of the RLF is not higher than a predetermined level, or a case where the signal strength in a neighboring cell is not higher than the predetermined level.

The counters may be reported to a network management entity (OAM & P) in a cumulative counting type. That is, the counters may not be reported whenever at least one value is changed, but may be reported when they exceed a predetermined reference value.

If the reestablishment cell is unsuitable, it may not be right that information on the corresponding connection failure is included as a statistical value to be used for mobility parameter control through an MRO mechanism. Accordingly, as described above, if it is determined that the inclusion of the corresponding connection failure is more unsuitable than the inclusion of the information on the suitability of the reestablishment in the handover report as described above, the RAP 120x may not transmit the handover report at all. In this case, the RAP that manages the counters as described above should necessarily be the RAP 120x. This is because the RAP that receives the handover report is unable to receive the information at all in the case where the reestablishment cell is not suitable, and thus it is unable to properly manage the counters.

Figure 6:
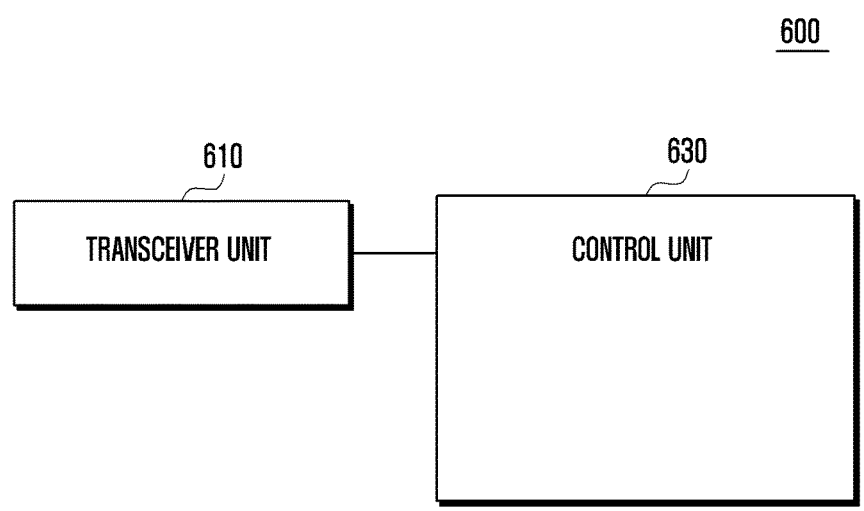
FIG. 6 is a diagram explaining a RAP according to an embodiment of the present disclosure.

FIG. 6 is a diagram explaining a RAP according to an embodiment of the present disclosure. In an embodiment of the present disclosure, a RAP 600 may include a transceiver unit 610 configured to perform communication with at least one network node, and a control unit 630 configured control the overall operation of the RAP 600.

In an embodiment of the present disclosure, RAPs in various situations may be provided. There may be a RAP that includes a serving cell of a terminal at the time of RLF or HOF and a RAP in which the terminal performs an initial reestablishment after the time of RLF or HOF. Further, there may be a RAP that performs reestablishment after the terminal performs the initial reestablishment.

First, the operation of the control unit 630 of the RAP that includes the serving cell of the terminal at the time of RLF or HOF will be described. The control unit 630 may operate to sense a Radio Link Failure (RLF) for at least one terminal, to receive an radio link failure indication message for the terminal, to determine whether a cell that is a target of RRC connection reestablishment of the terminal is a suitable serving cell of the terminal with respect to the RLF on the basis of the radio link failure indication message, and to apply the radio link failure indication message to handover support information update.

Further, the control unit 630 may operate to receive a message including a Radio Link Failure (RLF) report for a terminal from at least another base station, and to determine whether a cell in which an RRC connection reestablishment has been attempted by the terminal after the RLF is a cell that is suitable to serve the terminal at a time of RLF occurrence on the basis of at least one of RRC connection setup indicator information and the RLF report. The message may be an RLF indication message. The RRC connection setup indicator information may be an RRC Conn Setup Indicator IE, and the RRC Conn Setup Indicator IE may indicate whether the RLF report that is from the other base station is received after a connection reestablishment failure of the terminal or from another cell that is not the cell in which the connection reestablishment has been attempted.

Further, the control unit 630 may operate to determine whether to transfer an additional message to the base station that requires a mobility parameter control on the basis of the result of the determination. Further, the control unit 630 may operate to determine whether to increase a counter that is used for the mobility parameter control on the basis of the result of the determination.

Further, if the RLF report is included in the message, and the RRC connection setup indicator information is not included in the message, the control unit 630 may operate to determine to the cell in which the connection reestablishment has been attempted by the terminal after the RLF as the cell that is suitable to serve the terminal at the time of the RLF occurrence.

Further, if the RLF report and the RRC connection setup indicator information are included in the message, the control unit 630 may operate to determine the cell in which the connection reestablishment has been attempted by the terminal after the RLF as the cell that is unsuitable to serve the terminal at the time of the RLF occurrence.

Further, if the RLF report and the RRC connection setup indicator information are included in the message, the control unit 630 may operate to determine that the other base station includes a connection reestablishment failure cell or a cell to which the terminal has been handovered just after the connection reestablishment.

Further, if the RLF report is not included in the message, the base station 630 may operate to determine the cell in which the connection reestablishment has been attempted by the terminal after the RLF as the cell that is suitable to serve the terminal at the time of the RLF occurrence.

Further, if the cell is the cell that is suitable to serve the terminal at the time of the RLF occurrence, the control unit 630 may operate to transfer the additional message to the base station that requires the mobility parameter control. Further, if the cell is not the cell that is suitable to serve the terminal at the time of the RLF occurrence, the control unit 630 may operate not to transfer the additional message to the base station that requires the mobility parameter control.

Further, the control unit 630 may operate to sense the Radio Link Failure (RLF) for the terminal.

Further, if the reestablishment procedure is successful or complete, the control unit 630 may operate to determine that the reestablishment target cell is the suitable cell of the terminal with respect to the RLF.

Further, if the reestablishment target cell is the suitable serving cell of the terminal with respect to the RLF, the control unit 630 may operate to use the radio link failure indication message for the handover support information update, whereas if the reestablishment target cell is not the suitable serving cell of the terminal with respect to the RLF, the control unit 630 may operate not to use the radio link failure indication message for the handover support information update.

The radio link failure indication message may include indication information for indicating the result of the reestablishment, and the control unit 630 may determine the result of the reestablishment on the basis of the indication information. Further, the radio link failure indication message may include an RRC Conn Setup Indicator. The control unit 630 may determine the suitability of the reestablishment cell on the basis of whether the RRC Conn Setup Indicator is included when the RLF report is included in the radio link failure indication message.

Further, the control unit 630 may operate to determine that the reestablishment cell is unsuitable if the RRC Conn Setup Indicator is included when the RLF report is included in the radio link failure indication message.

Further, the control unit 630 may operate to determine whether there is another RAP that requires recognition of the RLF, and if it is determined that there is the other RAP, the control unit 630 may operate to transmit information on the RAF that is included in the received radio link failure indication message to the other RAP.

In the case of the RAP in which the terminal performs an initial reestablishment after the time of RLF or HOF, the control unit 630 may operate to generate and transfer indication information that indicates the result of the reestablishment.

In the case of the RAP in which the terminal perform the reestablishment again after performing the initial reestablishment, the control unit 630 may operate to transmit the RLF indication message that includes information for determining whether the RAP in which the initial reestablishment was performed and the RAP that performs the reestablishment again are the same RAP.

The RAP 600 according to an embodiment of the present disclosure has been described in a state where it is divided into blocks. However, this is merely for convenience in explanation, and the function and the operation of the RAP 600 are not limited thereto. The RAP 600 may perform the operations of the respective RAPs as described above with reference to FIGS. 1 to 5 and the operations between the respective RAPs and other network nodes, and the control unit 630 of the RAP 600 may control the operations.

Figure 7:
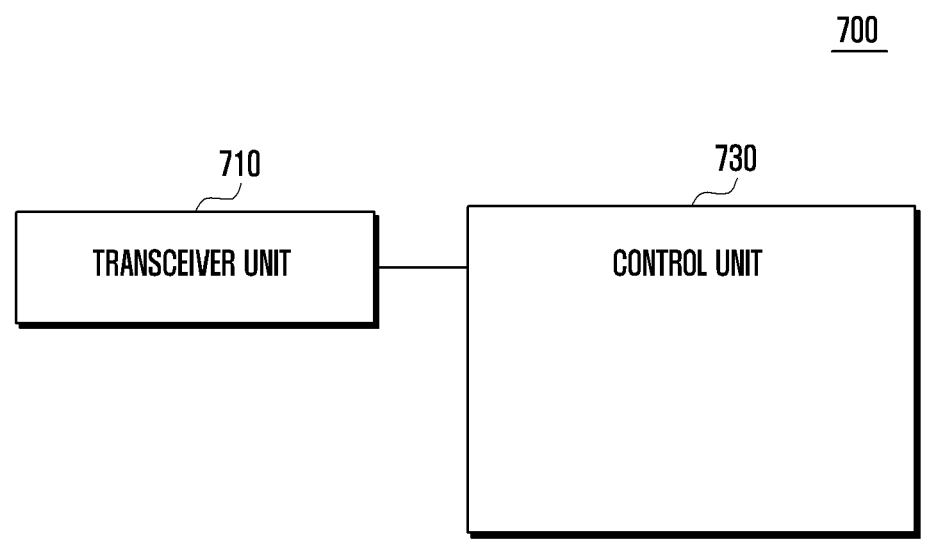
FIG. 7 is a diagram explaining a terminal according to an embodiment of the present disclosure.

FIG. 7 is a diagram explaining a terminal according to an embodiment of the present disclosure. In an embodiment of the present disclosure, a terminal 700 may include a transceiver unit 710 configured to perform communication with at least one network node, and a control unit 730 configured control the overall operation of the terminal 700.

According to an embodiment of the present disclosure, the control unit 730 may operate to perform a reestablishment procedure for at least one RAP after RLF sending.

Further, the control unit 730 may transfer information that indicates whether transmission of an RLF report is possible to the RAP. The control unit 730 may receive RLF report request information from at least one RAP, and may transmit the RLF report based on this.

The control unit 730 may transfer the RLF report that includes information that indicates the result of reestablishment performance to the RAP that has performed an initial reestablishment after the RLF. The RAP that has received the RLF report on the basis of the RLF report information may recognize the result of the reestablishment after the RLF of the terminal, and may prepare and transmit an RLF indication message based on this.

The terminal 700 according to an embodiment of the present disclosure has been described in a state where it is divided into blocks. However, this is merely for convenience in explanation, and the function and the operation of the terminal 700 are not limited thereto. The terminal 700 may perform the operation of the terminal as described above with reference to FIGS. 1 to 5 and the operations of the respective network nodes, and the control unit 730 of the terminal may control the operations.

It will be understood by those of ordinary skill in the art to which the present disclosure pertains that various changes in form and detail may be made therein without changing the technical idea or essential features of the present disclosure. Accordingly, it will be understood that the above-described embodiments are exemplary in all aspects and do not limit the scope of the present disclosure. Accordingly, the scope of the present disclosure is defined by the appended claims, and it will be construed that all changes and modifications derived from the meanings and scope of the following claims and the equivalent concept fall within the scope of the present disclosure.

In the above-described embodiments, all operations and messages may be the target of selective performance or the target of omission. Further, in the respective embodiments, it is not necessary that the operations are performed in due order, but the order of the operations may be changed. Further, it is not necessary that the message transfer operations are performed in due order, but the order thereof may be changed. The operations and messages may be independently performed.

A part or the whole of each table exemplified in the above-described embodiments are to help understanding of the embodiments of the present disclosure. Accordingly, it may be considered that the detailed contents of each table are to express parts of the method and the apparatus proposed in the present disclosure. That is, it is preferable that the contents of tables in the description are accessed in semantics rather than in syntax.

Meanwhile, preferred embodiments of the present disclosure disclosed in this specification and drawings and specific terms used therein are illustrated to present only specific examples in order to clarify the technical contents of the present disclosure and help understanding of the present disclosure, but are not intended to limit the scope of the present disclosure. It will be evident to those skilled in the art that various implementations based on the technical spirit of the present disclosure are possible in addition to the disclosed embodiments.

The invention claimed is:

1. A method for supporting a handover of a first base station in a wireless communication system, the method comprising:
    receiving, from a second base station, a first message including a radio link failure (RLF) report for a terminal;
    identifying whether the received first message includes a radio resource control (RRC) connection setup indicator;
    determining whether a cell in which an RRC connection reestablishment has been attempted by the terminal after the RLF is a proper candidate to serve the terminal at a time of the RLF based on the identification whether the received first message includes the RRC connection setup indicator; and
    transmitting a second message to a second base station or a third base station that requires a mobility parameter control based on the first message,
    wherein the RRC connection setup indicator indicates whether a connection reestablishment between the terminal and a fourth base station has failed or the terminal is handed over from the fourth base station to the second base station.

2. The method of claim 1, wherein a counter that is used for the mobility parameter control is determined based on a type of handover failure.

3. The method of claim 1, wherein the first message is an RLF indication message.

4. The method of claim 1, wherein if the first message does not include the RRC connection setup indicator, it is determined that the cell in which the connection reestablishment has been attempted by the terminal after the RLF is a proper candidate cell to serve the terminal.

5. The method of claim 1, wherein if the first message includes the RRC connection setup indicator, it is determined that the cell in which the connection reestablishment has been attempted by the terminal after the RLF is not a proper candidate cell to serve the terminal.

6. The method of claim 1, wherein if the first message includes the RRC connection setup indicator, it is determined that the connection reestablishment failed or the terminal is handed over as soon as the connection reestablishment succeeds.

7. The method of claim 1, wherein the second message is a handover report message.

8. A first base station in a wireless communication system, the first base station comprising:
    a transceiver unit; and
    a control unit coupled with the transceiver unit and configured to:
        receive a first message including a radio link failure (RLF) report for a terminal from a second base station;

identify whether the received first message includes a radio resource control (RRC) connection setup indicator;

determine whether a cell in which an RRC connection reestablishment has been attempted by the terminal after the RLF is a proper candidate to serve the terminal at a time of the RLF based on the identification whether the received first message includes the RRC connection setup indicator; and control the transceiver unit to transmit a second message to the second base station or a third base station that requires a mobility parameter control based on the first message, wherein the RRC connection setup indicator indicates whether a connection reestablishment between the terminal and a fourth base station has failed or the terminal is handed over from the fourth base station to the second base station.

9. The first base station of claim 8, wherein a counter that is used for the mobility parameter control is determined based on a type of handover failure.

10. The first base station of claim 8, wherein the first message is an RLF indication message.

11. The first base station of claim 8, wherein if the first message does not include the RRC connection setup indicator, the control unit determines the cell in which the connection reestablishment has been attempted by the terminal after the RLF as a proper candidate cell to serve the terminal.

12. The first base station of claim 8, wherein if the first message includes the RRC connection setup indicator, the control unit does not determine the cell in which the connection reestablishment has been attempted by the terminal after the RLF as a proper candidate cell to serve the terminal.

13. The first base station of claim 8, wherein if the first message includes the RRC connection setup indicator, the control unit determines that the connection reestablishment failed or the terminal is handed over as soon as the connection reestablishment succeeds.

14. The first base station of claim 8, wherein the second message is a handover report message.

* * * * *